US006740365B2

(12) United States Patent
Awokola et al.

(10) Patent No.: US 6,740,365 B2
(45) Date of Patent: May 25, 2004

(54) RADIATION-CURABLE COATING COMPOUNDS

(75) Inventors: Morenike Awokola, Leverkusen (DE); Carmen Flosbach, Wuppertal (DE); Helmut Loeffler, Bruehl (DE); Volker Paschmann, Essen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/417,900

(22) Filed: Apr. 15, 2003

(65) Prior Publication Data

US 2003/0212163 A1 Nov. 13, 2003

Related U.S. Application Data

(62) Division of application No. 09/825,390, filed on Apr. 3, 2001, now Pat. No. 6,605,669.

(51) Int. Cl.$^7$ ............... C09D 133/08; C08J 3/28; C08J 7/18; C08J 7/04
(52) U.S. Cl. ............... 427/512; 427/514; 427/508; 522/126; 525/123; 528/59; 528/60; 528/65
(58) Field of Search ............... 427/508, 512, 427/514; 522/126; 525/123; 528/59, 60, 65

(56) References Cited

U.S. PATENT DOCUMENTS

| 3,616,364 A | 10/1971 | D'Alelio |
| 4,376,187 A | 3/1983 | Theodore et al. |
| 4,748,211 A | 5/1988 | Das et al. |
| 5,331,050 A | 7/1994 | Harper |
| 5,354,797 A | 10/1994 | Anderson et al. |
| 5,361,616 A | 11/1994 | Takahashi et al. |
| 5,508,337 A | 4/1996 | Wamprecht et al. |
| 5,552,487 A | 9/1996 | Clark et al. |
| 5,576,063 A | 11/1996 | Briggs et al. |
| 5,612,434 A | 3/1997 | Epple et al. |
| 5,686,532 A | 11/1997 | Bederke et al. |
| 5,703,198 A | 12/1997 | Twigt et al. |
| 5,741,880 A | 4/1998 | Valpey, III |
| 6,174,953 B1 | 1/2001 | Huybrechts |
| 6,332,291 B1 | 12/2001 | Flosbach et al. |

FOREIGN PATENT DOCUMENTS

| DE | 19709560 | 3/1997 |
| DE | 19800528 | 1/1998 |
| DE | 19818735 | 4/1998 |
| EP | 0536712 | 4/1993 |
| EP | 0705853 | 4/1996 |
| WO | WO 98/00456 | 1/1998 |
| WO | WO 99/21906 | 5/2000 |

*Primary Examiner*—Susan Berman
(74) *Attorney, Agent, or Firm*—Steven C. Benjamin

(57) ABSTRACT

Coating compounds curable by means of high-energy radiation, comprising as binder A) at least one (meth)acrylic copolymer containing olefinic double bonds capable of free-radical polymerization and hydroxyl groups with a C=C equivalent weight from 100 to 10,000 and an OH-value from 20 to 250 mg KOH/g, which is prepared from monomers comprising:

A1) at least one olefinically unsaturated, epoxy-functional monomer capable of free-radical polymerization, A2) at least one olefinically unsaturated, carboxy-functional monomer capable of free-radical polymerization and A3) at least one further olefinically unsaturated monomer capable of free-radical polymerization which is different from A1) and A2), and B) at least one component with free isocyanate groups and process for multilayer coating using the coating compounds.

11 Claims, No Drawings

RADIATION-CURABLE COATING COMPOUNDS

CROSS REFERENCE TO RELATED APPLICATION

This application is a division of co-pending application Ser. No. 09/825,390, filed Apr. 3, 2001, now U.S. Pat. No. 6,605,669 which is hereby incorporated herein by reference.

FIELD OF THE INVENTION

The invention relates to coating compounds based on binders curable by high-energy radiation and to the use of the coating compounds for multi-layer coatings in the field of automotive and industrial coating.

DESCRIPTION OF RELATED ART

It is already known to use coating compounds curable by high-energy radiation in automotive coating. This application also utilizes the advantages of radiation-curable coating compounds such as, e.g., the very short curing times, the low solvent emission of the coating compounds and the good hardness and mar resistance of the resulting coatings.

In automotive coating, binders used in the coating compounds curable by high-energy radiation are generally those containing (meth)acryloyl groups and cure by free-radical polymerization initiated by UV radiation. However, coating compounds that cure by UV radiation, in addition to their undisputed advantageous properties, also have some disadvantages. Volume shrinkage of the coating applied occurs during curing, which may lead to tensions and cracking in the film and ultimately to detachment from the substrate. Moreover, particularly when coating three-dimensional objects, insufficient curing and hence unsatisfactory surface properties may occur in areas that are unexposed or under-exposed to UV radiation. In order to overcome these problems, it is also already known to use so-called dual-cure systems in which free-radical polymerization initiated by UV radiation is combined with a further chemical crosslinking mechanism.

For example, WO-A-98/00456 describes a binder system containing OH—, $NH_2$—, COOH—, NCO— or epoxy-functional compounds with at least one olefinic double bond capable of free-radical polymerization, photoinitiators and a binder system based on polyacrylate and/or polyester polyols with melamine resins or optionally, with blocked polyisocyanates, or a binder system based on carboxy-, anhydride- or amino-functional polyesters and/or polyacrylates with epoxy-functional polyesters and/or polyacrylates.

DE-A-197 09 560 describes a clear coat coating compound for automotive coating which contains binders curable by high-energy radiation and, in addition, a binder system curable by addition and/or condensation reactions and that is free from double bonds capable of free-radical polymerization. DE-A-198 18 735 describes a coating compound curable by high-energy radiation that contains components with double bonds capable of free-radical polymerization and with additional reactive groups and components with double bonds capable of free-radical polymerization and with additional reactive groups that are complementary to the reactive groups of the first component.

Moreover, coating systems curable by UV radiation which are based on urethane (meth)acrylates with (meth)acryloyl groups and free isocyanate groups, photoinitiators and compounds with groups that are reactive with isocyanate groups, and optionally, additional polyisocyanates are known from DE-A-198 00 528.

The dual-cure systems known from the prior art are still in need of improvement, however. For example, the adhesion to the substrate is still sometimes insufficient and does not guarantee rapid further treatment of the coated surfaces, e.g., by polishing or sanding. A well known general shortcoming of UV-curable coating compounds is the initial yellowing of the coatings obtained brought about by UV irradiation, with the result that the use of these binder systems in clear coats and top coats, particularly top coats containing pale pigments, e.g., white pigments, is considerably restricted.

This invention provides coating compounds based on binders curable by high-energy radiation that form coatings with defect-free surfaces and good adhesion to the substrate. The coatings are also uniformly and completely curable in shadow regions. The coatings also permit rapid further treatment, e.g., by sanding or polishing. The coating compounds result in non-yellowing or at least low-yellowing coatings after UV irradiation.

SUMMARY OF THE INVENTION

This invention is directed to coating compounds based on binders curable by high-energy radiation, comprising A) at least one (meth)acrylic copolymer containing olefinic double bonds capable of free-radical polymerization and hydroxyl groups with a C=C equivalent weight from 100 to 10,000 and an OH value from 20 to 250 mg KOH/g, which is prepared from monomers, comprising:

A1) at least one olefinically unsaturated epoxy-functional monomer capable of free-radical polymerization, A2) at least one olefinically unsaturated carboxy-functional monomer capable of free-radical polymerization, and A3) at least one further olefinically unsaturated monomer capable of free-radical polymerization which is different from A1) and A2), and B) at least one component with free isocyanate groups.

DETAILED DESCRIPTION OF THE EMBODIMENTS

The coating compounds according to the invention are based on a combined crosslinking mechanism of free-radical polymerization initiated by high-energy radiation and a polyaddition reaction between hydroxyl and isocyanate groups.

Component A), the (meth)acrylic copolymers, preferably contain olefinic double bonds in the form of (meth)acryloyl groups. Reference will always be made hereinafter to (meth)acryloyl groups. The terms "(meth)acryloyl" and "(meth)acrylic" mean acryloyl and/or methacryloyl, and acrylic and/or methacrylic.

Component A) of the coating compound according to the invention concerns (meth)acrylic copolymers capable of free-radical polymerization containing olefinic double bonds and hydroxyl groups that preferably have a C=C equivalent weight from 300 to 8,000, particularly preferably from 500 to 5,000 and a hydroxyl value from 20 to 200 mg KOH/g, particularly preferably from 80 to 150 mg KOH/g.

The (meth)acrylic copolymers (component A) are preferably prepared from:

10–50 wt. %, particularly preferably 15–35 wt. % of component A1),

5–40 wt. %, particularly preferably 5–25 wt. % of component A2) and

10–80 wt. %, particularly preferably 20–60 wt. % of component A3).

The number-average molecular mass Mn of the (meth) acrylic copolymers (component A) may be, for example, 1,000–10,000 g/mole, preferably 2,000–8,000 g/mole.

The (meth)acrylic copolymers (component A) are prepared from the monomer components A1), A2) and A3). Examples of suitable olefinically unsaturated epoxy-functional monomers capable of free-radical polymerization (component A1) include (meth)allylglycidyl ether, 3,4-epoxy-1-vinylcyclohexane, epoxycyclohexyl (meth) acrylate, vinylglycidyl ether, 2-methylglycidyl (meth) acrylate and glycidyl (meth)acrylate. The use of glycidyl (meth)acrylate is preferred.

Examples of suitable olefinically unsaturated carboxy-functional monomers capable of free-radical polymerization (component A2) include olefinically unsaturated mono- and/or dicarboxylic acids, such as, (meth)acrylic acid, maleic acid, fumaric acid, crotonic acid and isocrotonic acid and the corresponding half esters and anhydrides of the olefinically unsaturated dicarboxylic acids. The use of (meth)acrylic acid is particularly preferred.

Component A3) concerns any olefinically unsaturated monomers capable of free-radical polymerization, which are different from A1) and A2). Component A3) preferably comprises:

A3a) esters of olefinically unsaturated carboxylic acids capable of free-radical polymerization, optionally A3b) olefinically unsaturated hydroxy-functional monomers capable of free-radical polymerization, and optionally A3c) further olefinically unsaturated monomers capable of free-radical polymerization, which are different from A3a) and A3b).

Examples of suitable esters of olefinically unsaturated carboxylic acids capable of free-radical polymerization (monomers A3a) include, in particular, esters of alpha,beta-olefinically unsaturated monocarboxylic acids with aliphatic, cycloaliphatic or aromatic alcohols. Examples of suitable olefinically unsaturated carboxylic acids include acrylic acid, methacrylic acid, crotonic acid and isocrotonic acid. The alcohols are, in particular, aliphatic, cycloaliphatic or aromatic, monohydric branched or unbranched alcohols having 1–20 carbon atoms in the molecule. Component A3) concerns preferably esters of (meth)acrylic acid. Examples of (meth)acrylates with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Cycloaliphatic (meth)acrylates may also, optionally, be substituted. The substituents are, for example, one or more, e.g., up to three alkyl groups, particularly those having 1–4 carbon atoms. Examples of (meth)acrylates with cycloaliphatic alcohols are cyclohexyl acrylate, trimethyl-cyclohexyl acrylate, 4-tert. butylcyclohexyl acrylate, isobornyl acrylate and the corresponding methacrylates. Examples of (meth)acrylates with aromatic alcohols are benzyl (meth)acrylates.

Examples of suitable monomers A3b) include hydroxy-alkyl esters of alpha, beta-olefinically unsaturated monocarboxylic acids with primary or secondary hydroxyl groups. For example, these may be the hydroxyalkyl esters of acrylic acid, methacrylic acid, crotonic acid and/or isocrotonic acid. The hydroxyalkyl esters of (meth)acrylic acid are preferred. The hydroxyalkyl radicals may contain, for example, 1–10 carbon atoms, preferably 2–6 carbon atoms. Examples of suitable hydroxyalkyl esters of alpha,beta-olefinically unsaturated monocarboxylic acids with primary hydroxyl groups are hydroxyethyl (meth)acrylate, hydroxypropyl (meth) acrylate, hydroxybutyl (meth)acrylate, hydroxyamyl (meth) acrylate, hydroxyhexyl (meth)acrylate. Examples of suitable hydroxyalkyl esters with secondary hydroxyl groups are 2-hydroxypropyl (meth)acrylate, 2-hydroxybutyl (meth) acrylate, and 3-hydroxybutyl (meth)acrylate.

Further monomers A3b) that may be used are reaction products of alpha, beta-unsaturated monocarboxylic acids with glycidyl esters of saturated monocarboxylic acids branched in the alpha position, e.g., with glycidyl esters of saturated alpha-alkylalkane monocarboxylic acids or alpha, alpha'-dialkylalkane monocarboxylic acids. These are preferably the reaction products of (meth)acrylic acid with glycidyl esters of saturated alpha, alpha-dialkylalkane monocarboxylic acids having 7–13 carbon atoms in the molecule, particularly preferably having 9–11 carbon atoms in the molecule. The formation of these reaction products may take place before, during or after the copolymerization reaction.

Further monomers A3b) that may be used are reaction products of hydroxyalkyl (meth)acrylates with lactones. The reaction takes place by means of an esterification reaction taking place with ring opening of the lactone, in which hydroxyl groups are formed anew in the terminal position in the form of hydroxyalkyl ester groups corresponding to the lactone in each case. Examples of suitable hydroxyalkyl (meth)acrylates include those mentioned above. Examples of suitable lactones include those containing 3–15 carbon atoms in the ring, and the rings may also contain various substituents. Preferred lactones are gamma-butyrolactone, delta-valerolactone, epsilon-caprolactone, beta-hydroxybeta-methyl-delta-valerolactone, lambda-laurinlactone or mixtures thereof. Epsilon-caprolactone is particularly preferred. The reaction products are preferably those of one mole of a hydroxyalkyl ester of an alpha, beta-unsaturated monocarboxylic acid and 1–5 mole, preferably on average 2 mole, of a lactone.

Examples of suitable monomers A3c) include vinyl esters, such as, vinyl acetate, vinyl propionate and vinyl esters of saturated monocarboxylic acids branched in the alpha position, e.g., vinyl esters of saturated alpha, alpha'-dialkylalkane monocarboxylic acids and vinyl esters of saturated alpha-alkylalkane monocarboxylic acids having in each case 5–13 carbon atoms, preferably 9–11 carbon atoms in the molecule.

Vinylaromatic hydrocarbons may also be used as monomers A3c), preferably, those having 8–12 carbon atoms in the molecule. Examples of such monomers are styrene, alpha-methylstyrene, chlorostyrenes, vinyltoluenes, 2,5-dimethylstyrene, p-methoxystyrene and tertiary-butylstyrene.

Small proportions of olefinically polyunsaturated monomers may also be used as monomers A3c). These are monomers with at least two double bonds capable of free-radical polymerization. Examples thereof are divinylbenzene, butane 1,4-diol diacrylate, hexane 1,6-diol diacrylate, neopentylglycol dimethacrylate, glycerol dimethacrylate. (Meth)acrylamides and derivatives thereof, (meth)acrylonitriles and silane-functional unsaturated monomers may also be used as monomers A3c).

Preferred (meth)acrylic copolymers (component A) are prepared from glycidyl (meth)acrylate as component A1), (meth)acrylic acid as component A2) and alkyl esters of (meth)acrylic acid with aliphatic and/or cycloaliphatic alcohols having 1–20 carbon atoms as component A3). Optionally, hydroxyalkyl esters of (meth)acrylic acid having, for example, 1–10 carbon atoms in the hydroxyalkyl radical and/or further olefinically unsaturated monomers capable of free-radical polymerization and different from A3a) and A3b) may be used as component A3).

The preparation of the hydroxy-functional and preferably (meth)acryloyl-functional (meth)acrylic copolymers (component A) may be carried out in a manner known to the skilled person. For example, an epoxy-functional and optionally hydroxy-functional (meth)acrylic copolymer may be prepared initially from components A1) and A3) and the addition of carboxy-functional unsaturated monomers (component A2), e.g., (meth)acrylic acid to at least a part of the epoxy groups may take place in a second step in order to introduce the (meth)acryloyl groups. The preparation of the epoxy-functional and optionally hydroxy-functional (meth)acrylic copolymers in the first step may take place by free-radical copolymerization. This may take place in a manner known to the skilled person by conventional methods, particularly by free-radical solution polymerization using radical initiators. Examples of suitable radical initiators include dialkyl peroxides, diacyl peroxides, hydroperoxides such as cumene hydroperoxide, peresters, peroxydicarbonates, perketals, ketone peroxides, azo compounds such as 2,2'-azo-bis-(2,4-dimethyl-valeronitrile, azo-bis-isobutyronitrile, C—C-splitting initiators such as, e.g., benzpinacol derivates. The initiators may be used, for example, in amounts from 0.1 wt. % to 4.0 wt. %, based on the starting weight of monomers.

Examples of suitable organic solvents which may be used advantageously in solution polymerization and also later in the coating compounds according to the invention include: glycol ethers such as ethylene glycol dimethylether; propylene glycol dimethylether; glycol ether esters, such as, ethyl glycol acetate, butyl glycol acetate, 3-methoxy-n-butyl acetate, butyl diglycol acetate, methoxypropyl acetate, esters such as butyl acetate, isobutyl acetate, amyl acetate; ketones such as methyl ethyl ketone, methyl isobutyl ketone, cyclohexanone, isophorone, aromatic hydrocarbons (e.g. with a boiling range from 136–180° C.) and aliphatic hydrocarbons.

Chain transfer agents, such as, mercaptans, thioglycollic acid esters, cumene or dimeric alpha-methylstyrene may be used to control the molecular weight.

The reaction of at least a part of the epoxy groups of the (meth)acrylic copolymers prepared in the first step with carboxy-functional unsaturated monomers, e.g., (meth) acrylic acid, then takes place in the second step. The reaction may generally take place at temperatures from 60° C. to 200° C., preferably at 80° C. to 140° C. The equivalent ratio of epoxy groups to carboxyl groups may be, for example, 3:1 to 1:1, preferably 2,5:1 to 1,2:1. During the ring-opening reaction of the epoxy groups with the carboxyl groups, secondary hydroxyl groups are formed, accounting at least partially for the hydroxyl functionality of the (meth)acrylic copolymers (component A). Further hydroxyl groups may be introduced by the use of corresponding olefinically unsaturated hydroxy-functional monomers capable of free-radical polymerization (component A3b).

The (meth)acrylic copolymers may generally be used individually or in mixture.

Radical inhibitors may be added to the binder solutions to prevent premature polymerization of the double bonds present. Examples of radical inhibitors are hydroquinone, 4-methoxyphenol, 2,6-di-tert.-butyl4-methylphenol, phenothiazine, 3,5-di-tertiary-butyl-4-hydroxyanisole, 2-tertiary-butyl-4-hydroxyanisole, 3-tertiary-butyl-4-hydroxyanisole, p-benzoquinone.

Component B) of the coating compound according to the invention concerns compounds with free isocyanate groups. These may be, for example, polyisocyanates with free isocyanate groups. Polyisocyanates with free isocyanate groups are, for example, any organic polyisocyanates with aliphatically, cycloaliphatically, araliphatically and/or aromatically bound free isocyanate groups. The polyisocyanates are liquid at room temperature or liquefied by the addition of organic solvents. The polyisocyanates generally have a viscosity from 1 to 6,000 mPas at 23° C., preferably over 5 and below 3,000 mPas.

Polyisocyanates of this kind are known to the skilled person and described in the literature.

The polyisocyanates are preferably those with an average NCO functionality from 1.5 to 5, preferably 2 to 4.

The so-called "paint (coating) polyisocyanates" are particularly suitable, for example, those based on hexamethylene diisocyanate (HDI), 1-isocyanato-3,3,5-trimethyl-5-isocyanatomethyl-cyclohexane (IPDI) and/or bis (isocyanatocyclohexyl)-methane and the known derivatives of these diisocyanates containing biuret, allophanate, urethane and/or isocyanurate groups from which excess starting diisocyanate is removed after their preparation, preferably by distillation, to a residual content of less than 0.5 wt. %. Triisocyanates such as nonane triisocyanate may also be used.

Sterically hindered polyisocyanates are also suitable. Examples thereof are 1,1,6,6-tetramethyl-hexamethylene diisocyanate, 1,5-dibutyl-pentamethyl diisocyanate, p- or m-tetramethylxylylene diisocyanate and the corresponding hydrogenated homologues.

In principle, diisocyanates may be reacted in the conventional manner to higher functionality compounds, for example, by trimerization or by reaction with water or polyols such as, trimethylolpropane or glycerol.

The polyisocyanate crosslinking agents may be used individually or in mixture. These are the conventional polyisocyanate crosslinking agents used in the coatings industry, which are described comprehensively in the literature and are also available as commercial products.

Isocyanate-modified resins, e.g., NCO-functional acrylate, polyurethane, polyester and/or epoxy resins may be used in addition to or instead of the above-mentioned polyisocyanates as isocyanate-functional component B). Suitable isocyanate-modified resins also include resins with free isocyanate groups and with olefinic double bonds capable of free-radical polymerization. Examples thereof include conventional (meth)acryloyl-functional oligomeric and/or polymeric compounds based on poly(meth)acrylate, polyurethane, polyester, polyester urethane and/or epoxy resins having number-average molecular masses from, for example, 300 to 10,000, which contain, in addition, one or more isocyanate groups.

In addition to the hydroxy-functional and preferably (meth)acryloyl-functional (meth)acrylic copolymers A), the coating compounds according to the invention may also contain further hydroxy-functional binders. The further hydroxy-functional binders may be, for example, hydroxy-functional polyester, alkyd, polyurethane, and/or poly(meth) acrylate resins. These binders are sufficiently well known to the skilled person.

In addition to the hydroxy-functional and preferably (meth)acryloyl-functional (meth)acrylic copolymers A), the coating compounds according to the invention may contain further olefinically unsaturated binders capable of free-radical polymerization. These may be unsaturated polyesters and/or (meth)acryloyl-functional oligomeric and/or polymeric compounds based on poly(meth)acrylate, polyurethane, polyester, polyester urethane and/or epoxy resins with a number-average molecular mass from, for example, 300 to 10,000, preferably 800 to 10,000.

The (meth)acrylic copolymers curable by high-energy radiation (component A) may be used in combination with radiation-curable reactive thinners, that are, low molecular weight compounds capable of free-radical polymerization with a molecular mass below 500 g/mole. The reactive thinners may be mono-, di- or polyunsaturated. Examples of monounsaturated reactive thinners are: (meth)acrylic acid and esters thereof, maleic acid and half esters thereof, vinyl acetate, vinyl ether, substituted vinyl ureas, styrene, vinyltoluene. Examples of diunsaturated reactive thinners are: di(meth)acrylates, such as, alkylene glycol di(meth)acrylate, polyethylene glycol di(meth)acrylate, butane 1,3-diol di(meth)acrylate, vinyl (meth)acrylate, allyl (meth)acrylate, divinylbenzene, dipropylene glycol di(meth)acrylate, hexane diol di(meth)acrylate. Examples of polyunsaturated reactive thinners are: glycerol tri(meth)acrylate, trimethylolpropane tri(meth)acrylate, pentaerythritol tri(meth) acrylate, pentaerythritol tetra(meth)acrylate. Reactive thinners capable of reacting with NCO groups may also be used. The reactive thinners may be used individually or a mixture of a suitable combination of thinners may be used.

The coating compounds according to the invention may also contain physically drying binders. The term physically drying binders means those binders that cure only by the release of solvent from the coating layer applied. Physically drying binders used may be the physically drying, solvent-based or water-thinnable polyurethane, alkyd, polyester and/or polyacrylate resins known to the skilled person.

Components A) and B) are used preferably in such a way that an equivalent ratio of the OH groups of component A) to the isocyanate groups of component B) is 1:3 to 3:1, preferably 1:1.5 to 1.5:1. Optionally present hydroxyfunctional components must also be taken into account here in addition to component A).

The coating compounds according to the invention may be waterborne or solvent-based coating compounds. They may contain water and/or organic solvents. In the case of waterborne coating compounds, the binders contained may be ionically or nonionically stabilized in order to achieve sufficient water thinnability. Alternatively or in addition, it is possible to achieve water thinnability by means of external emulsifiers.

The organic solvents that may be contained in the coating compounds according to the invention are conventional paint solvents. These may originate from the preparation of the binders or may be added separately. Examples of suitable solvents are those already mentioned above for solution polymerization.

The coating compounds according to the invention may contain fillers and/or transparent and color- and/or special effect-imparting pigments. Suitable color-imparting pigments include all the conventional paint pigments of an organic or inorganic nature. Examples of inorganic or organic color-imparting pigments include titanium dioxide, micronized titanium dioxide, iron oxide pigments, carbon black, azo pigments, phthalocyanine pigments, quinacridone or pyrrolopyrrole pigments. Examples of special effect-imparting pigments include metallic pigments, e.g., of aluminum, copper or other metals; interference pigments such as, e.g., metal oxide-coated metallic pigments, e.g., titanium dioxide-coated or mixed oxide-coated aluminum, coated mica, such as, titanium dioxide-coated mica and graphite special-effect pigments. Soluble dyes may also be contained therein. Examples of suitable fillers include silica, aluminum silicate, barium sulfate, calcium carbonate and talc.

The coating compounds may also contain conventional paint additives. Examples of conventional paint additives include leveling agents, rheology-influencing agents, such as, fine-particle silica or polymeric urea compounds, thickeners, e.g., based on partially crosslinked, carboxyfunctional polymers or polyurethanes, defoamers, wetting agents, anti-crater agents, catalysts, antioxidants and light stabilizers based on HALS (hindered amine light stabilizers) products and/or UV absorbers. The additives are used in conventional amounts known to the skilled person.

Photoinitiators are contained in the coating compounds curable by high-energy radiation according to the invention. Suitable photoinitiators include, for example, those that absorb in the wavelength range from 190 to 600 nm. Examples of photoinitiators for free-radical curing systems are benzoin and derivatives thereof, acetophenone and derivatives thereof, such as, 2,2-diacetoxyacetophenone, benzophenone and derivatives thereof, thioxanthone and derivates thereof, anthraquinone, 1-benzoylcyclohexanol, organophosphorus compounds such as, e.g., acylphosphine oxides. The photoinitiators are used, for example, in amounts from 0.1–7 wt. %, preferably 0.5–5 wt. %, based on the sum of prepolymers capable of free-radical polymerization, reactive thinners and photoinitiators. The photoinitiators may be used individually or in combination.

The coating compounds according to the invention are prepared in a conventional manner known to the skilled person. As these are two-component coating compounds, the components A) and B) that react with one another and the other reactive components optionally present are mixed together only immediately prior to application. Generally speaking, the coating compounds may be adjusted to spray viscosity with water and/or organic solvents, if necessary, prior to application.

After application of the coating compounds according to the invention and optionally after a brief flash-off phase and/or an IR (infra red) irradiation phase, irradiation takes place with high-energy radiation, preferably with UV radiation. The preferred source of radiation is UV radiation sources with emissions in the wavelength range from 180 to 420 nm, particularly from 200 to 400 nm. Examples of such UV radiation sources include optionally doped mercury high pressure, medium pressure and low pressure radiation emitters, gas discharge tubes such as, xenon low pressure lamps, UV lasers, UV point source radiation emitters such as, UV-emitting diodes and black light tubes.

Apart from these continuously operating UV radiation sources, however, it is also possible to use discontinuous UV radiation sources. These are preferably so-called high-energy flash devices (UV flash lamps for short). The UV flash lamps may contain a plurality of flash tubes, for example, quartz tubes filled with inert gas, such as, xenon. The UV flash lamps have an intensity of illumination of, for example, at least 10 megalux, preferably from 10 to 80 megalux per flash discharge. The energy per flash discharge may be, for example, 1 to 10 kjoule.

The irradiation time with UV radiation when UV flash lamps are used as the source of UV radiation may be, for example, in the range from 1 millisecond to 400 seconds, preferably from 4 to 160 seconds, depending on the number of flash discharges selected. The flashes may be triggered, for example, about every 4 seconds. Curing may take place, for example, by means of 1 to 40 successive flash discharges.

If continuous UV radiation sources are used, the irradiation time may be, for example, in the range from a few seconds to about 5 minutes, preferably less than 5 minutes.

The distance between the UV radiation sources and the substrate surface to be irradiated may be, for example 5 to 60 cm.

If the coatings are irradiated by means of UV radiation, particularly with UV flash lamps, temperatures generated on the coating are generally such that they may already lead to curing or partial curing by means of the additional crosslinking mechanism.

In order to cure the coating compounds by means of the additional crosslinking mechanism, the coatings may be left after the irradiation process to cure completely, for example, at room temperature, e.g., for 16–24 hours. It is also possible to carry out full curing at higher temperatures of, for example, 30° C. to 120° C., preferably 40° C. to 80° C. Complete curing may take place by conventional methods, e.g., in a heated chamber or by means of IR radiation. Depending on the curing temperature, curing times from, e.g., 1 to 60 minutes are possible. Of course, it is also possible to carry out the thermal curing before the irradiation process as well as before and after the irradiation process.

The coating compounds according to the invention may be used in a process for multi-layer coating. The invention also relates, therefore, to a process for multi-layer coating of substrates by applying a top coat layer to a substrate coated with one or more coating layers, e.g., with a primer and/or filler layer, wherein the top coat layer composed of a color- and/or special effect-imparting base coat coating compound and a clear coat coating compound or composed of a pigmented one-layer top coat coating compound is applied, and wherein at least one of the coating layers of the multi-layer structure composed of a coating compound according to the invention described above is applied and cured by means of high-energy radiation, preferably UV radiation.

The coating compounds according to the invention may therefore be used for the preparation of one or more of the following coating layers of a multi-layer structure: primer, filler, base coat, clear coat, one-layer top coat layer. The coating compounds according to the invention are used preferably for the preparation of filler, clear coat and one-layer topcoat layers.

The coating compounds according to the invention may be applied by conventional methods, preferably by spray application.

Suitable substrates include any substrates, such as, metal and plastic substrates, e.g., iron, zinc, aluminum, magnesium, refined steel or alloys thereof, and polyurethanes, polycarbonates or polyolefins.

If the coating compounds according to the invention are used as fillers, they may be applied to already pre-coated or pretreated substrates, but they may also be applied to existing coatings. For example, they may be applied to conventional solvent-based or waterborne stoppers, primers, adhesion primers or further intermediate layers of the kind normally used in automotive coating.

If the coating compounds according to the invention are used as clear coats in a multi-layer structure, the clear coat may be applied to a solvent-based or waterborne base coat.

If the coating compounds according to the invention are used as pigmented topcoats, they may be applied to conventional waterborne or solvent-based filler layers.

The coating compounds according to the invention may be used in the multi-layer structure in each case only for the filler, clear coat or topcoat layer. They may also, however, be used simultaneously for several different coating layers in a multi-layer structure. Radiation curing of the individual layers may take place in each case with a different radiation intensity and a different irradiation time, or a different number of flash discharges for each layer individually or for two or more layers together. In the latter case, short interim curing, e.g., interim irradiation with 1 to 2 flash discharges may take place.

The process according to the invention may find application in industrial and automotive coating, in the latter case, both in production line automotive coating and in automotive refinishing.

Coatings obtained with the coating compounds according to the invention have defect-free surfaces and good adhesion to the substrate and good interlayer adhesion. The coatings also cure uniformly and completely in shadow regions that are unexposed or underexposed to UV radiation. The coatings permit rapid further treatment, e.g., by sanding or polishing. Non-yellowing/low yellowing coatings are also obtained with the coating compounds according to the invention after UV irradiation.

The invention shall be explained in more detail on the basis of the examples below. All parts and percentages are on a weight basis unless otherwise indicated.

EXAMPLE 1

Preparation of Acryloyl and Hydroxyl Functional Acrylic Resin A

In a 3 l three necked glass reactor equipped with stirrer, thermocouple and dropping funnel 560 parts by wt. of Solvesso® 100 (Exxon; mixture of different aliphatics and aromatics) are heated to 148° C. At 148° C. a mixture of 166 parts by wt. isobornyl methacrylate, 449 parts by wt. tertiary butyl acrylate, 120 parts by wt. hydroxy ethyl methacrylate and 332 parts by wt. glycidyl methacrylate are dosed over 6 h. Simultaneously a mixture of 42 parts by wt. of ditertiary butyl peroxide and 58 parts by wt. of tertiary butyl peroctoate are dosed. 40 parts by wt. of Solvesso® 100 are used for the rinsing of the monomer and initiator pipes. After 6 h dosing the batch is kept at 148° C. for additional 4 h. Afterwards 0.05 parts by wt. of 4-methoxy phenol are added to the batch. The batch is cooled to 120° C. and 126 parts by wt. of acrylic acid and 100 parts by wt. of Solvesso® 100 are added. The batch is kept at 120° C. till the acid number is below 1 mgKOH/g resin solids.

The resulting resin is a clear solution with solids content (1 h/150° C.)=64.9%, viscosity (25° C.)=915 mPas, color number (Hazen)=15.

EXAMPLE 2

Preparation of Acryloyl and Hydroxyl Functional Acrylic Resin B

In a 3 l three necked glass reactor equipped with stirrer, thermocouple and dropping funnel 396 parts by wt. of Solvesso® 100 (Exxon; mixture of different aliphatics and aromatics) are heated to 148° C. At 148° C. a mixture of 365 parts by wt. glycidyl methacrylate, 242 parts by wt. tertiary butyl acrylate, 229 parts by wt. ethyl hexyl acrylate, 226 parts by wt. isobutyl methacrylate, 79 parts by wt. hydroxy ethyl methacrylate and 75 parts by wt. hydroxy propyl methacrylate are dosed over 6 h. Simultaneously a solution of 32 parts by wt. of ditertiary butyl peroxide and 34 parts by wt. of tertiary butyl peroctoate in 66 parts by wt. of Solvesso® 100 are dosed. 66 parts by wt. of Solvesso 100 are used for the rinsing of the monomer and initiator pipes. After 6 h dosing the batch is kept at 148° C. for additional 4 h. Afterwards 0.05% parts by wt. of 4-methoxyphenole are added to the batch. The batch is cooled to 120° C. and 138 parts by wt. of acrylic acid and 242 parts by wt. of Solvesso® 100 are added. The batch is kept at 120° C. till the acid number is below 1 mgKOH/g resin solids.

The resulting resin is a clear solution with solids content (1 h/150° C.): 64.0%, viscosity (25° C.)=1570 mPas, color number (Hazen)=25.

EXAMPLE 3

Preparation of Clear Coats

A clear coat according to the invention was formulated from the following constituents:

- 55.0 parts by wt. of acrylate resin A from Example 1
- 2.0 parts by wt. of butyl acetate
- 0.2 parts by wt. of a commercial leveling agent based on polysiloxane (EFKA 31/EFKA CHEMICAL)
- 1.2 parts by wt. of Irgacure 184 (photoinitiator based on hydroxyketone/Ciba)
- 0.1 parts by wt. of DBTL solution (10% in butyl acetate)
- 0.07 parts by wt. of Tinuvine® 292 (HALS product/Ciba)
- 0.29 parts by wt. of Tinuvin® 1130 (UV absorber based on benzotriazole/Ciba)

The resulting clear coat component was mixed with 18.0 parts by wt. of a commercial polyisocyanate crosslinking agent (Desmodur® 3390/Bayer; based on HDI-isocyanurate) with intensive stirring. The mixture was then adjusted to spray viscosity with 18 parts by wt. of butyl acetate.

DBTL=dibutyltin dilaurate
HALS=Hindered Amine Light Stabilizer
HDI=hexamethylene diisocyanate
Parts by wt.=parts by weight A comparison clear coat was formulated from the following constituents:

- 65.0 parts by wt. of a commercial binder curable by UV radiation based on an OH-functional acrylacrylate (Jägalux UV 5154, 54% butyl acetate/Jäger Chemie GmbH)
- 10.0 parts by wt. of butyl acetate
- 0.15 parts by wt. of a commercial leveling agent based on polysiloxane (EFKA 31/EFKA CHEMICAL)
- 1.4 parts by wt. of Irgacure 184 (photoinitiator based on hydroxyketone/Ciba)
- 0.12 parts by wt. of DBTL solution (10% in butyl acetate)
- 0.2 parts by wt. of Tinuvin® 292 (HALS product/Ciba)
- 0.29 parts by wt. of Tinuvin® 1130 (UV absorber based on benzotriazole/Ciba)

The resulting comparison clear coat component was mixed with 15.0 parts by wt. of a commercial polyisocyanate crosslinking agent (Desmodur® 3390/Bayer; based on HDI-isocyanurate) with intensive stirring. The mixture was then adjusted to spray viscosity with 15 parts by wt. of butyl acetate.

Application and curing of clear coat and comparison clear coat Commercial solvent-based 2-pack polyurethane fillers were applied to steel sheets coated with electro-dipcoat and cured for 30 min at 60° C. The coating was then sanded with sandpaper P 400 and cleaned with silicone remover. A commercial solvent-based white base coat (Standox base coat, Standox GmbH) was applied to the resulting filler layer. After a flash-off time of 10 min at room temperature, the clear coat prepared above and comparison clear coat were applied. After a flash-off time of 10 min at room temperature, the clear coats were initially heated for 3 min with a conventional infra-red radiation emitter and then irradiated for a further 2 min with infra-red radiation and UV radiation with a distance of 60 cm between radiation emitter and object. The UV radiation emitter used was a conventional UV radiation emitter (80 W/cm).

Determination of Adhesion

After 3 days' storage at room temperature, the steel sheet coated with clear coat according to the invention underwent a test in a constant atmosphere of condensation water (DIN 50017) for 72 h.

After 24 h regeneration at room temperature, a crosscut test to DIN 53151 and a gloss measurement to DIN 67530 were carried out, and the degree of blistering was assessed to DIN 53209.

Crosscut result: 0–1

Blistering result: m0/g0

Gloss measurement result: 60°=93 units (Gloss meter: Micro-TRI-gloss from Byk Gardener GmbH)

Satisfactory adhesion results and excellent gloss were obtained.

Determination of Initial Yellowing after UV Crosslinking

In order to determine the initial yellowing, the b* values (CIELAB system) of the clear coat according to the invention and the comparison clear coat were measured with a spectrophotometer (to DIN 6174) after UV irradiation. The standard used was a standard clear coat (Standocryl 2-pack HS clear coat, Standox GmbH). The b* values of the latter after application and curing for 30 min at 60° C. were also measured. The difference delta-b* in the b* values between the clear coat according to the invention and standard clear coat and between the comparison clear coat and standard clear coat were calculated.

Delta b* values of clear coat according to the invention/standard clear coat: +0.1

Visually, these delta b* values are acceptable.

Delta b* values of comparison clear coat/standard clear coat: +1.5

These delta b* values are visually no longer acceptable. The yellowing is too great.

Polishability:

After cooling, the clear coat according to the invention can be polished satisfactorily. Haze-free surfaces with satisfactory gloss and without polishing marks were obtained. A completely haze-free surface could not be obtained with the comparison clear coat after polishing.

EXAMPLE 4

Preparation of a Filler Coating Compound Based on Acrylate Resin B According to Example 2

A filler coating compound was formulated from the following constituents:

- 20.0 parts by wt. of the acrylate resin B according to Example 2

1.2 parts by wt. of a commercial dispersing aid based on an acid copolymer (Disperbyk 110, 52% in methoxy propyl acetate/alkylbenzene/Byk)

10.8 parts by wt. of butyl acetate 10.0 parts by wt. of kaolin (filler)

3.0 parts by wt. of talc (filler)

30.0 parts by wt. of barytes (filler)

1.2 parts by wt. of titanium dioxide 0.06 parts by wt. of carbon black 0.8 parts by wt. of Irgacure 819 (photoinitiator based on phenyl phosphine oxide) (Ciba)

0.1 parts by wt. of DBTL solution, 10% in butyl acetate

The resulting filler component was mixed with 4.7 parts by wt. of a commercial polyisocyanate crosslinking agent (Desmodur® 3390/Bayer; based on HDI-isocyanurate) with intensive stirring. The mixture was then adjusted to spray viscosity with 5 parts by wt. of butyl acetate.

Application and Curing of Fillers

Steel sheets coated with electro-dipcoat were coated with the filler prepared above in a dry film layer thickness of about 120 μm. After a flash-off time of 5 min at room temperature, the filler layers were initially heated for 3 min with a conventional infra-red radiation emitter and then irradiated for a further 2 min with infra-red radiation and UV radiation, with a distance of 60 cm between radiation emitter and object. The UV radiation emitter used was a conventional UV radiation emitter (80 W/cm).

After cooling, the filler layers could be sanded without difficulty. After the filler layers had been sanded, a test panel was overcoated with a commercial, solvent-based black base coat (Standox base coat, Standox GmbH) and a commercial solvent-based 2-pack polyurethane clear coat (Standocryl 2-pack HS clear coat, Standox GmbH). A further test panel was overcoated with a commercial solvent-based 2-pack polyurethane topcoat (Standox topcoat Gentian Blue RAL 5010, Standox GmbH). In both cases, curing took place for 30 minutes at 60° C.

After 3 days' storage at room temperature, the test panels underwent a test in a constant atmosphere of condensation water (DIN 50017). After 24 h regeneration at room temperature, a crosscut test to DIN 53151 and a gloss measurement to DIN 67530 were carried out, and the degree of blistering to DIN 53209 was assessed.

Crosscut result (overcoated with base coat/clear coat): 0–1

Crosscut result (overcoated with one-layer topcoat): 0–1

Blistering result (overcoated with base coat/clear coat): m0/g0

Blistering result (overcoated with one-layer topcoat): m0/g0

Gloss measurement (overcoated with base coat/clear coat) 60°=92 units

Gloss measurement (overcoated with top coat) 60°=88 units (Gloss meter: Micro-TRI-gloss from Byk Gardener GmbH)

No detachment from the substrate was observed.

The filler layers exhibited good solvent resistance and low volume shrinkage after UV irradiation. As a result, excellent gloss values of subsequently applied topcoat and clear coat were obtained.

What is claimed is:

1. A multi-layer coating process for coating a substrate comprising applying a top coat coating layer to a substrate precoated with at least one precoating coating layer, wherein said topcoat coating layer comprises a color and/or special effect-imparting base coat coating layer and a clear coat coating layer, wherein at least one of the coating layers applied to said substrate comprises a binder comprising A) at least one (meth)acrylic copolymer containing olefinic double bonds capable of free-radical polymerization and hydroxyl groups with a C=C equivalent weight from 100 to 10,000 and an OH-value from 20 to 250 mg KOH/g, which is prepared from monomers comprising:

A1) at least one olefinically unsaturated, epoxy-functional monomer capable of free-radical polymerization, A2) at least one olefinically unsaturated, carboxy-functional monomer capable of free-radical polymerization and A3) at least one further olefinically unsaturated monomer capable of free-radical polymerization which is different from A1) and A2); and B) at least one crosslinking agent with free isocyanate groups;

further wherein the at least one coating layer comprising said binder and being applied to said substrate is cured by means of high-energy radiation.

2. The multi-layer coating process of claim 1, wherein the at least one coating layer comprising said binder is the clear coat coating layer.

3. The multi-layer coating process of claim 1, wherein the at least one coating layer comprising said binder is the color and/or special effect-imparting base coat coating layer.

4. The multi-layer coating process of claim 1, wherein the at least one coating layer comprising said binder is the at least one precoating coating layer.

5. The multi-layer coating process of claim 4, wherein the at least one precoating coating layer is selected from at least one of a primer layer, a filter layer and mixtures thereof.

6. The multi-layer coating process of claim 1, wherein the at least one precoating coating layer is selected from at least one of a primer layer, a filler layer and mixtures thereof.

7. A multi-layer coating process for coating a substrate comprising applying a topcoat coating layer to a substrate precoated with at least one precoating coating layer, wherein said topcoat coating layer comprises a pigmented one-layer topcoat coating layer, wherein at least one of the coating layers applied to said substrate comprises a binder comprising A) at least one (meth)acrylic copolymer containing olefinic double bonds capable of free-radical polymerization and hydroxyl groups with a C=C equivalent weight from 100 to 10,000 and an OH-value from 20 to 250 mg KOH/g, which is prepared from monomers comprising:

A1) at least one olefinically unsaturated, epoxy-functional monomer capable of free-radical polymerization, A2) at least one olefinically unsaturated, carboxy-functional monomer capable of free-radical polymerization and A3) at least one further olefinically unsaturated monomer capable of free-radical polymerization which is different from A1) and A2); and B) at least one crosslinking agent with free isocyanate groups;

further wherein the at least one coating layer comprising said binder and being applied to said substrate is cured by means of high-energy radiation.

8. The multi-layer coating process according to claim 7, wherein the at least one precoating coating layer is selected from at least one of a primer layer, a filler layer and mixtures thereof.

9. The multi-layer coating process according to claim 7, wherein the at least one coating layer comprising said binder is the pigmented one-layer topcoat coating layer.

10. The multi-layer coating process according to claim 7, wherein the at least one coating layer comprising said binder is the at least one precoating coating layer.

11. The multi-layer coating process according to claim 10, wherein the at least one precoating coating layer is selected from at least one of a primer layer, a fillet layer and mixtures thereof.

\* \* \* \* \*